(12) United States Patent
Müller et al.

(10) Patent No.: US 12,485,839 B2
(45) Date of Patent: Dec. 2, 2025

(54) CONNECTION DEVICE FOR ELECTRICALLY CONNECTING A PLURALITY OF FIRST ELECTRICAL COMPONENTS TO AN ENERGY STORAGE DEVICE AND CONNECTION ARRANGEMENT

(71) Applicant: AUDI AG, Ingolstadt (DE)

(72) Inventors: Christopher Müller, Ingolstadt (DE); Martin Schaar, Burgthann (DE); Martin Schüssler, Kösching (DE)

(73) Assignee: AUDI AG, Ingolstadt (DE)

( * ) Notice: Subject to any disclaimer, the term of this patent is extended or adjusted under 35 U.S.C. 154(b) by 320 days.

(21) Appl. No.: 18/484,729

(22) Filed: Oct. 11, 2023

(65) Prior Publication Data

US 2024/0140335 A1    May 2, 2024

(30) Foreign Application Priority Data

Oct. 31, 2022 (DE) .......................... 102022128805.6

(51) Int. Cl.
   *H01R 25/16*   (2006.01)
   *B60R 16/023*  (2006.01)
   *B60R 16/033*  (2006.01)

(52) U.S. Cl.
   CPC ........ *B60R 16/0238* (2013.01); *B60R 16/033* (2013.01); *H01R 25/162* (2013.01); *H01R 2201/26* (2013.01)

(58) Field of Classification Search
   None
   See application file for complete search history.

(56) References Cited

U.S. PATENT DOCUMENTS

| | | | |
|---|---|---|---|
| 9,325,129 B2* | 4/2016 | Soneda | H01R 25/003 |
| 10,960,834 B2* | 3/2021 | De Oliveira | H02G 3/08 |
| 2016/0195575 A1* | 7/2016 | Soneda | G01R 21/06 |
| | | | 324/117 H |

FOREIGN PATENT DOCUMENTS

| | | | | |
|---|---|---|---|---|
| CN | 110890678 A | * | 3/2020 | .......... H01R 25/161 |
| DE | 69908896 T2 | * | 5/2004 | .......... H01R 25/168 |
| DE | 102006024391 A1 | | 11/2007 | |
| DE | 102011004355 A1 | | 8/2012 | |
| DE | 102011121849 A1 | | 1/2013 | |

(Continued)

OTHER PUBLICATIONS

Search Report issued on Jul. 26, 2023, in corresponding German Application No. 102022128805.6, 8 pages.

*Primary Examiner* — Tho D Ta
(74) *Attorney, Agent, or Firm* — Maier & Maier, PLLC

(57) ABSTRACT

A connection device for electrically connecting a plurality of first electrical components to a second electrical component and for arrangement on a first housing of the second component. In the interior at least one first and one second potential connection are arranged. The connection device includes a connection strip, which on a first side has a plurality of electrical plug-in connection units for respective electrical connection of one of the first components by a respective plug-in connection and a second opposite side relative to a first direction, for arrangement on a first component, a contacting unit which has a carrier for arrangement on a through opening of the first housing and at least one contact pair arranged on the carrier for electrically contacting the first and second potential connection.

20 Claims, 3 Drawing Sheets

(56) References Cited

FOREIGN PATENT DOCUMENTS

| DE | 102011089839 A1 | 6/2013 |
|----|-----------------|--------|
| DE | 202016106356 U1 | 11/2016 |
| DE | 102017217154 A1 | 1/2019 |
| DE | 102018220184 B4 | 5/2022 |

* cited by examiner

CONNECTION DEVICE FOR ELECTRICALLY CONNECTING A PLURALITY OF FIRST ELECTRICAL COMPONENTS TO AN ENERGY STORAGE DEVICE AND CONNECTION ARRANGEMENT

FIELD

The invention relates to a connection device for electrically connecting a plurality of first electrical components to a second electrical component of a motor vehicle and for arrangement on a first housing of the first component. Furthermore, the invention also relates to a connection arrangement.

BACKGROUND

The second electrical component can be an energy storage device of the motor vehicle, for example a high-voltage energy storage device, in particular a high-voltage battery, of the motor vehicle or an electronic unit or electronic box that is electrically connected to the energy storage device and can be arranged directly on the energy storage housing. This can also be referred to as a battery junction box. The first electrical components can be, for example, electrical consumers, in particular high-voltage consumers, of the high-voltage electrical system of the motor vehicle or also a charging connection for electrically charging the energy storage device. Electrical components and high-voltage batteries usually require multiple contacts for power and data lines. These connections are used to connect consumers, such as axle drives, refrigerant compression and other auxiliary consumers. In addition, control and sensor lines as well as charging lines for electrically charging the high-voltage battery are usually connected.

There are a variety of requirements for the positioning of the plug-in points in the vehicle. These must ideally be accessible for initial installation and in the event of repairs. In the event of a crash, they should be positioned in a protected region. In addition, the requirements for tightness and high-voltage safety should also be met. These requirements for high-voltage safety and tightness result in relatively large plug-in systems for which positioning with regard to the criteria mentioned above is difficult. Since the penetration of water into a high-voltage battery can have serious consequences, such penetration should be avoided even in the event of a consequential fault, such as a damaged connection cable or an internal leak in a connected component. This currently requires very complex sealing of plugs, plug receptacles and the cables themselves. It would therefore be desirable to simplify the electrical connections of electrical components to an energy storage device.

DE 10 2006 024 391 A1 describes a protection unit with multiple plugs for use in motor vehicles, wherein the protection unit has a busbar as a power supply and a plurality of connections for individual consumers, which are electrically connected to the busbar directly or via intermediate fuses. The busbar has a contact tongue which is designed to be brought into conductive contact directly as a plug geometry with an external potential without the interposition of another connection contour.

SUMMARY

The object of the present invention is to provide a connection device and a connection arrangement which provide the connection of a plurality of first electrical components to a second electrical component, in particular an energy storage device of a motor vehicle, in the simplest possible manner.

A connection device according to the invention for electrically connecting a plurality of first electrical components to a second electrical component of a motor vehicle and for arrangement on a first housing of the second component has a connection strip which has a first side and a second side opposite with respect to a first direction, for arrangement on a first component, wherein the first side has a plurality of electrical plug-in connection units for respective electrical connection of one of the plurality of first electrical components by means of a respective plug-in connection. In addition, the connection device comprises a contacting unit which has a carrier for arrangement at a through opening of the first housing and at least one contact pair arranged on the carrier with a first contact element for electrically contacting a first potential connection of the second component and a second contact element for electrically contacting a second potential connection the second component. In addition, the connection device comprises an electrical line arrangement, by means of which the plurality of plug-in connection units are electrically conductively connected to the at least one contact pair.

The invention is based on the realization that by providing a connection strip that has several plug-in connection units, it is possible to bring together and bundle the connections for the respective plug-in connection units via a common contacting unit, so that ultimately only the contacting unit with the potential connections located in the housing is to be contacted. This simplifies the connection and, above all, the sealing enormously. In particular, this makes it possible to connect a plurality of first components to the second component by only providing a single through opening in the first housing of the second component and then accordingly arranging the carrier of the contacting unit in a sealed manner at this through opening or aperture in the first housing. There is therefore no need for a through opening for a respective plug-in connection unit, but only a single, common through opening for the contacting unit and thus for all of the plug-in connection units comprised in the connection strip. By combining the plug-in connection units in a common connection strip, it is also possible to implement the power supply via the line arrangement of these plug-in connection units to the contact elements, bundled within a connection strip housing. This in turn makes it possible, for example, to already combine the same potentials within the connection strip or in the strip housing. This can, for example, also reduce the number of transfer points to the second electrical component. In other words, the number of contact pairs comprised in the contacting unit can be reduced compared to the plug-in connection units comprised in the connection strip. Overall, this can save installation space, the sealing measures can be much simpler, and overall this leads to a much simpler design option for such a connection device.

Thus, only one opening needs to be provided on the electronics housing, namely the first housing of the second component, through which all contacts can then be guided, in particular the at least one contact pair. Moreover, only one seal is needed for sealing. This seal can then be arranged accordingly between the carrier and the first housing. The so-called longitudinal water-tightness can also be implemented much more easily in such a connection strip or in the connection device. For example, the sealing measures for providing such longitudinal water-tightness can be limited to the contact inlets of the contact elements into the first housing. In other words, not all plug-in connection units have to be sealed separately with regard to such longitudinal water-tightness. This also greatly reduces the sealing effort. In addition, the combination of multiple interfaces, namely the plug-in connection units in a connection strip as part of the connection device, enables the number of individual parts to be reduced. In addition, this also allows a much easier connection to a cooling device, since, for example, all plug-in connection units can be cooled at the same time by such cooling. This is particularly advantageous at high currents, as is common in the high-voltage range.

The second component is preferably an energy storage device of the motor vehicle or an electronics box or electronic unit associated with the energy storage device. The energy storage device can be designed, for example, as a high-voltage energy storage device, in particular as a high-voltage battery. The electronics unit can have a housing, which can be designed as a separate housing, in particular separately from the housing of the energy storage device, but is preferably fluidly connected to the interior of the energy storage housing. In such an electronic unit, for example, a converter device, switching elements, contactors, fuses, an on-board charger for AC (alternating current) charging, a 230V connection or similar can be arranged. The first potential connection can, for example, be associated with a first high-voltage potential, which is provided by the energy storage, and the second potential connection can be associated with a second high-voltage potential, which is provided by the energy storage. If the second component is not the energy storage itself, it is correspondingly electrically coupled to both energy storage potentials in order to provide the corresponding potential connections.

The connection strip can, for example, be designed such that it has a longitudinal extension direction in a second direction that is different from the first direction and, for example, perpendicular to it. The respective plug-in connection units can, for example, be arranged next to one another in the second direction. The elongated design simplifies the arrangement of the individual conductors of the line arrangement relative to one another. The terminal strip may have a thickness in the first direction that is smaller than a length of the terminal strip in the second direction. The connection strip can also, for example, have a width in a third direction that is smaller than the length of the connection strip, but preferably greater than the thickness of the connection strip. The connection strip can also have a strip housing, as already mentioned. The strip housing can, for example, comprise a base plate which has a circumferential edge protruding from the base plate with respect to the first direction. The edge points in an opposite direction with respect to the plug-in connection units protruding from the base plate. On the second side of the connection strip, the strip housing can therefore be designed with a kind of recess. The electrical conductors of the electrical line arrangement can be arranged in this recess, at least some of the electrical conductors comprised in the electrical line arrangement. Conductor holders for holding the electrical conductors or conductor tracks or conductor rails, an electrically insulating potting compound or the like can also be arranged in this recess, as explained in more detail later.

If the connection strip is in a state, in which it is arranged on the first component, the first component can at least partially close the rear opening of the strip housing. A part of the line arrangement is arranged between the base plate of the strip housing and the first component, when the connection device is in the intended operational state in a motor vehicle.

The first component can be a housing component, such as a housing component of the first housing of the second component. However, it can also be a housing component of another housing, in particular another component, or a component different from a housing, for example a heat exchanger or a cooling device or similar, as will be explained in more detail later.

In principle, the strip housing can be made of a metallic material or of an electrically insulating material, such as a plastic material. If the strip housing is made of a metallic material, it can also represent part of an electromagnetic shielding of the connection device. If the housing is made of a plastic, the connection device can have an additional shielding element, for example in the form of a shielding plate or similar inserted into the strip housing. If the housing is made of plastic, the plug receptacles of the respective plug-in connection devices, which are also made of plastic, can be made in one piece with the strip housing. The plug receptacles simultaneously provide contact protection for the plug-in connection devices and can optionally also include a coding that corresponds to the plugs of the respective first components to be excluded. This can ensure that a respective plug-in connection unit can only be coupled to the plug assigned to it of the assigned first electrical component, in particular one of the first components.

In addition to the plastic plug receptacles, the plug-in connection units can also include metal inserts to provide electromagnetic shielding. In addition, the plug-in connection units can each have two contact elements for electrically contacting a corresponding plug of the corresponding first electrical component. In addition, the plug-in connection units can be designed as plugs or sockets. These are preferably designed as sockets into which the corresponding plugs of the respective first electrical components can be inserted. In any case, the respective plug-in connection units and the corresponding connections of the first electrical components can be coupled to one another via a plug-in connection. Due to the design geometry of the respective plug-in connection units, a plug-in direction of this plug-in connection can be defined in the first direction.

For example, if the strip housing is made of metal, such as aluminum, the plug-in connection units can be mounted on the strip housing as a finished component. A shielding integrated into a respective plug-in connection unit is contacted with the strip housing for a continuous shielding.

The plug-in connection units can also be referred to as header and the connection strip can also be referred to as a header strip. In some cases, the plug-in connection units are also referred to as plug receptacles or device receptacles within the scope of the invention, since device plugs can be inserted therein.

The electrical line arrangement includes a plurality of electrical lines. The cable routing can be designed differently depending on the application. The electrical lines can also be provided in a variety of ways, for example as wires, busbars or the like. The term electrical line arrangement can in particular be understood as the entirety of all electrical conductors via which the corresponding contacts of the respective plug-in connection units are contacted with the at least one contact pair.

The connection device is preferably used on a high-voltage component or is used to electrically connect high-voltage components of a high-voltage electrical system of the motor vehicle. Therefore, the connection device is preferably designed as a high-voltage connection device. This is then characterized by a correspondingly high current-carrying capacity of the components that carry current during normal operation, as well as by suitable dimensioning of electrical insulation and shielding.

Incidentally, not only one contact pair mentioned above can be provided, but also several contact pairs. The plug-in connection units can also be electrically connected to different contact pairs. Nevertheless, in this case too, it is preferred that the connection device comprises more plug-in connection units than contact pairs. In other words, it is very advantageous to combine or join at least some of the power connections.

Therefore, a further very advantageous embodiment of the invention provides that the line arrangement has a first bus line which is electrically conductively connected to the first contact element and has a second bus line which is electrically conductively connected to the second contact element, wherein the plurality of plug-in connection units comprise a first plug-in connection unit and a second plug-in connection unit, each of which has a first connection contact which is electrically conductively connected to the first bus line, and a second connection contact which is electrically conductively connected to the second bus line. By connecting the two plug-in connection units to the two bus lines, the plug-in connection units can be connected in parallel with respect to the contact pair. The contacting to the corresponding potential connections inside the first housing can then be implemented for the two plug-in connection units via a common, individual contact pair. Incidentally, not only two plug-in connection units can be connected in an electrically conductive manner to the bus lines, but also three or four or five, etc. Such bus lines can save enormous amounts of installation space, which significantly simplifies the interconnection and contacting with the second component. In addition, the contacting unit itself, which includes the contact pairs to be contacted with the second component, can be made significantly smaller than the connection strip itself. In sum, the through opening provided in the first housing can also be designed to be smaller than if individual through openings had to be provided for a respective one of the connection units. The opening area of the first housing can thus be kept minimal. This in turn makes it easier to seal the first housing.

The bus lines can, for example, be designed as rigid or flexible busbars or as partly rigid and partly flexible busbars or other electrical lines.

In a further advantageous embodiment of the invention, the contacting unit has a plurality of contact pairs arranged on the same side of the carrier. The contacting of various first components with the second component or with the potential connections can also take place via partially different contact pairs. This is advantageous, for example, if one of the first components is one with a significantly higher power requirement, for example a pulse inverter, for example for a rear axle drive and/or front axle drive. Other high-voltage auxiliary consumers can be connected via plug-in connection units, which are brought together on a common contact pair by the connection unit. The connection unit can therefore provide separate contact pairs, for example for the main consumers, and shared contact pairs for the high-voltage auxiliary consumers.

Accordingly, it can also be provided that the plurality of plug-in connection units comprise a third plug-in connection unit, which also has a first connection contact and a second connection contact, which are electrically conductively connected to a respective contact element of a second contact pair of the contacting unit, which is different from the first contact pair, which is electrically contacted with the bus lines described above.

The contact elements of the contact pairs can also be designed as screw contacts or plug-in contacts. If these are screw contacts, the contact elements can be designed flat with a through hole through which the contact elements can be screwed to the corresponding potential connections.

In a further advantageous embodiment of the invention, the carrier of the contacting unit is arranged on the second side of the connection strip. The carrier of the contacting unit and the connection strip can, for example, be rigidly connected to one another. For example, the strip housing and the carrier can also be designed in one piece. This enables a particularly compact design of the connection device. However, the contacting unit is preferably shorter than the connection strip in terms of its length in the second direction. This can also be made shorter than the connection strip in terms of its width in relation to the third direction defined above. This in turn has the advantage that the through opening to be provided in the first housing can be made very small, since only the contacting unit with the at least one contact pair has to be arranged at this through opening. The connection strip itself with the respective plug-in connection units can be arranged outside the first housing. So to speak, only the significantly smaller contacting unit, which is arranged on the rear of the connection strip, is projecting into the first housing, in particular through the through opening provided in this first housing. The connection device can also be designed in such a way that, when the carrier or a part of it is arranged on the first housing as intended, the carrier or a part of it rests on the outside of the housing and only the contact elements of the contact pairs protrude into the interior of the housing. However, the carrier itself can also protrude through the through opening in the housing. The carrier can be sealed from the first housing by a seal. In this case, not every plug-in connection unit has to be sealed separately from the first housing, but only the contacting unit, in particular as a whole, so that, for example, a peripheral seal is sufficient.

In a further very advantageous embodiment of the invention, the contacting unit is designed to be spatially separated from the connection strip, and the line arrangement has a connecting portion via which the contacting unit and the connection strip are connected. This advantageously makes it possible for the connection strip to be arranged spatially spaced from the contacting unit. This has the enormous advantage that significantly more flexibility can be provided with regard to the adaptation options to a specific installation space situation. For example, it may be that only a small amount of installation space is available in the open region of the first housing, on which the contacting unit is to be arranged. The connection unit can therefore advantageously also be arranged and fixed at a different location. The electrically conductive connection between the two units, that is, between the contacting unit and the connection strip, is then provided via the connecting portion of the line arrangement. This makes it much easier to meet the requirements for the positioning of the plug-in points. This, namely the connection strip, can therefore be arranged much more easily in a position that is particularly easy to access, for example in the event of repairs or for initial assembly. In addition, the connection strip can be arranged much more easily in a safe and protected position in the event of a crash.

This also makes it possible for the above-mentioned first housing component, on which the connection strip is arranged as intended, to be provided not by the first housing of the second electrical component, but rather, for example, by another second housing of another component. In particular, this component does not even have to represent a housing component, the connection strip can basically be arranged on any component present in the vehicle.

According to a further advantageous embodiment of the invention, the connecting portion of the line arrangement is designed to be flexible. This advantageously enables a relative movement between the contacting unit and the connection strip. This advantageously also enables tolerance compensation through the connecting portion. This is very advantageous in two respects. On the one hand, this offers significantly more flexibility with regard to the arrangement and positioning of the two units, that is, the contacting unit and the connection strip on their respective components, namely on the first housing and on the first component. Small tolerances in the installation position can thus advantageously be easily compensated for. Another big advantage is the possibility of tolerance compensation in the event of mechanical stress or vibrations. Components of the motor vehicle are subject to constant movement, particularly while driving. This means that relative movements between components can never be completely ruled out. A flexible design of the connecting portion is therefore significantly gentler on the two connecting components, namely the contacting unit and the connection strip, and the robustness against mechanical stress can thus be significantly increased. The connecting portion can additionally be covered by electrical insulation, regardless of whether it is designed to be flexible or not. This can also be covered by an electromagnetic shielding. Such shielding around the electrically insulating housing can also be considered part of the connecting portion. The shielding and the electrical insulation then correspondingly encase an electrical conductor of the connecting portion. This electrical conductor can be designed, for example, as a flexible wire or as a flexible conductor rail or as a flexible conductor tape.

Furthermore, the connection strip can also include a conductor holder for guiding the electrical conductors of the line arrangement. This conductor holder can be designed to be electrically insulating and at the same time ensure that the corresponding electrical lines are electrically insulated from one another. The conductor holder can be provided, for example, by structural elements on the rear side of the connection strip, for example within the recess provided by the strip housing. The structural elements can be provided, for example, by an optionally glued plastic insert inserted into the recess. The conductor holder can also be provided by an electrically insulating potting compound which fills the back of the strip housing. Such a potting compound can also simultaneously provide electrical insulation between the individual electrical conductors. In addition, such a potting compound can also be used to also seal the connection strip.

Furthermore, it is advantageous if the connection devices are designed with a shielding. For this purpose, as already mentioned, the individual parts can also comprise individual shielding elements. The shielding of the connection device can therefore be composed of the entirety of these individual shielding elements. It is particularly advantageous if a shielding is provided which is plated through from a respective plug-in connection unit up to the first housing of the second component. In other words, there is an electrically conductive connection between a shielding of a cable connected via a plug-in connection unit up to the first housing of the second component. This shielding preferably encloses all current-carrying components.

Furthermore, the invention also relates to a housing arrangement having a connection device according to the invention or one of its embodiments.

Furthermore, it is very advantageous if the connection arrangement has the first housing of the second component, in particular of the energy storage or an electronic unit assigned to the energy storage, wherein the carrier is arranged at the through opening of the first housing, so that the at least one contact pair projects into an interior of the first housing and at least the plug-in connection units are arranged outside the first housing. In particular, the entire connection strip can be arranged outside the first housing and, as described above, it can even be arranged on another component or on another part.

In addition, the connection arrangement can include not only the first housing of the second component, but also, for example, the second component itself. In addition, the connection arrangement can also have the first component, provided that this is not already provided by the second component itself.

In a further advantageous embodiment of the invention, the carrier is arranged in a sealed manner at the through opening. This can advantageously ensure that the first component housing is sealed tight despite the through opening. In addition, the individual contact element or each individual plug-in connection unit does not have to be sealed relative to the first housing. For example, it is sufficient to provide a seal that seals the carrier from the first housing. The contact elements of the at least one contact pair can each be sealed on their own again in terms of longitudinal water-tightness. For example, the individual contact elements can be sealed relative to an electrical insulation that surrounds the respective contact elements on the contour. This can prevent liquid from getting through the contacting unit, in particular through small gaps between the contact elements and, for example, parts of the carrier.

In a further advantageous embodiment of the invention, the connection strip is arranged on the first component, which is part of a third component that is different from the second component, in particular part of a second housing that is different from the first housing, on which the contacting unit is arranged. If the contacting unit is arranged, for example, on the housing of the electronics box, the connection strip can be arranged on another component, for example the battery housing itself, or on a housing of another consumer or on a component that is not a housing at all. There are basically no limits to the arrangement options. However, an arrangement is advantageous which is as close as possible to the contacting unit in order to keep the connecting portion between the contacting unit and the connection strip as short as possible, which reduces the susceptibility to wear. The components mentioned can also be part of the connection arrangement.

In a further advantageous embodiment of the invention, the connection strip is arranged on the first component, which represents part of an electromagnetic shielding of the connection strip. A part of the first component can therefore advantageously also be used to provide the electromagnetic shielding. The first component is accordingly preferably made of a metallic material, for example aluminum. The first component can also be part of the connection arrangement. In particular, the first component can represent a housing component of a housing of a component, for example the second component. The first component can also be provided by a cooling device. If the connection strip also has the potting compound described above, it can be connected directly to the cooling device, which improves the thermal coupling to the line arrangement. Particularly efficient cooling of the connection device can thus be provided.

The invention also includes developments of the method according to the invention, which have features as those which have already been described in conjunction with the developments of the connection device according to the invention. For this reason, the corresponding developments of the method according to the invention are not described again here.

Furthermore, the invention also relates to a motor vehicle having a connection arrangement according to the invention or one of its embodiments.

The motor vehicle according to the invention is preferably designed as an automobile, in particular as a passenger car or truck, or as a passenger bus or motorcycle.

The invention also comprises the combinations of the features of the described embodiments. The invention also comprises implementations that each have a combination of the features of several of the described embodiments, provided that the embodiments were not described as mutually exclusive.

BRIEF DESCRIPTION OF THE FIGURES

Exemplary embodiments of the invention are described hereinafter. In particular.

DETAILED DESCRIPTION

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

Figure 1:
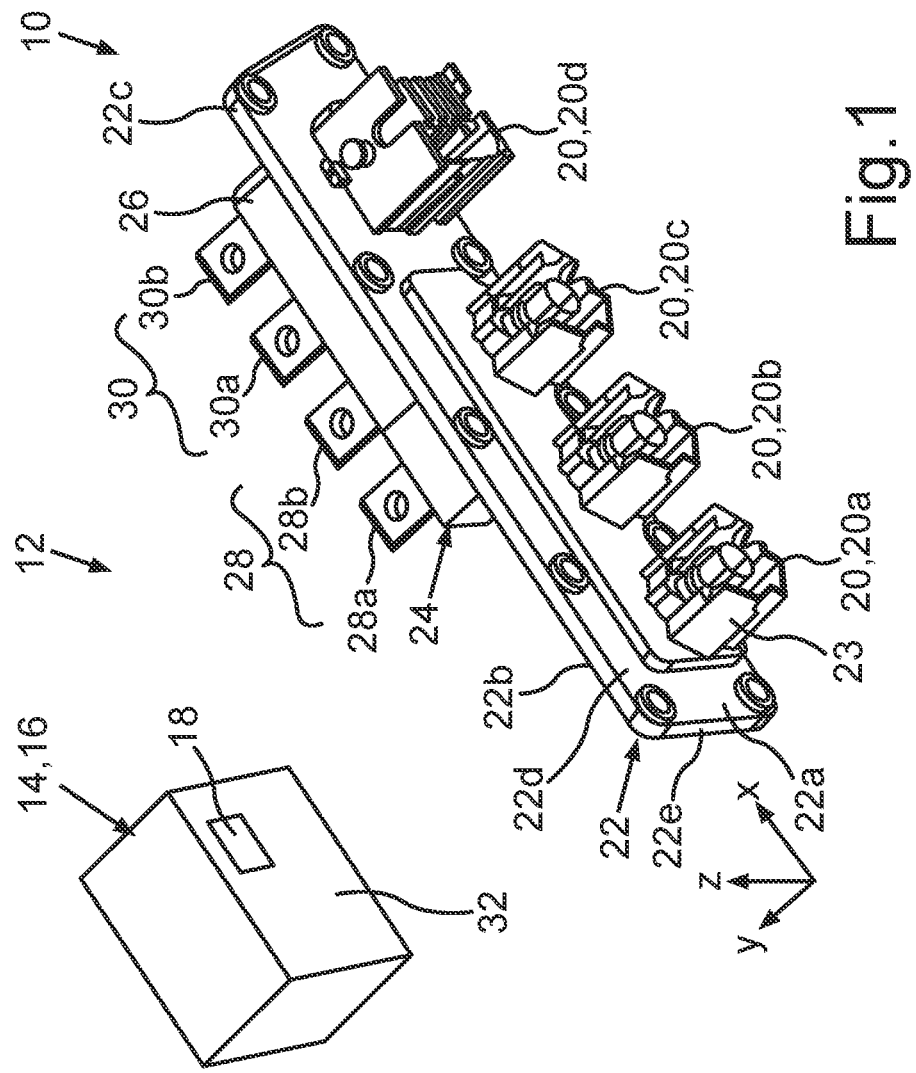
FIG. 1 shows a schematic representation of a connection device according to an exemplary embodiment of the invention.

In the figures, same reference numerals respectively designate elements that have the same function FIG. 1 shows a schematic and perspective illustration of a connection device 10 according to an exemplary embodiment of the invention. The connection device 10 can be understood as part of a connection arrangement 12, which also includes a housing 14 of an electrical component, for example a high-voltage battery 16 or an electronics box arranged on the high-voltage battery 16. In other words, in the present example, the connection device 10 is arranged on a housing 14 of a high-voltage battery 16, wherein the connection device 10 is shown in FIG. 1 in the state not arranged on the housing 14, for better illustration. The connection device 10 preferably serves to electrically connect and contact other electrical components of the motor vehicle in which the connection arrangement 12 is used, in particular high-voltage components, with the high-voltage battery 16. These electrical components can be, for example, an electric air conditioning compressor, power electronics for a front axle drive and/or power electronics for a rear axle drive, a high-voltage heater, a DC/DC converter or even a charging connection to charge the battery 16. For this purpose, the battery 16 provides two high-voltage potentials, not shown here, namely a positive high-voltage potential and a negative high-voltage potential. The components mentioned can then be electrically contacted with corresponding potential connections of the energy storage device 16 via the connection device 10.

These potential connections are located inside the housing 14. Accordingly, a corresponding through opening 18 must be provided in the housing 14 to provide the contact.

Usually, a separate aperture in the housing is provided for each plug-in interface. This makes sealing these interfaces very complex.

The connection device 10 can now advantageously combine several plug-in connection units 20. Basically, the connection unit 10 is divided into a connection strip 22 and a contacting unit 24. With respect to a first direction, which is referred to here as the y-direction, the connection strip 22 has a first side 22a, which represents a front side of the connection strip, and an opposite second side 22b, which is also referred to as the rear side here. The already mentioned plug-in connection units 20 are arranged on the front side 22a. In this example, four plug-in connection units 20a, 20b, 20c, 20d are provided. These can, for example, have an electrically insulating plug receptacle 23 and a geometric coding so that the plug-in connections cannot be confused and a plug cannot be plugged into another connection 20. In the present example, the three plug-in connections 20a, 20b, 20c are assigned to high-voltage auxiliary consumers, and the plug-in connection 20d is assigned to a drive of the motor vehicle or a pulse inverter. This plug-in connection 20d is also designed geometrically differently than the plug-in connections 20a, 20b, 20c. The contacting unit 24 further has a carrier 26 and at least one connection pair, in the present case two connection pairs 28, 30, each of which comprises a first contact element 28a, 30a and a second contact element 28b, 30b. The first contact elements 28a, 30a are assigned to a first potential connection and the second contact elements 28b, 30b are assigned to a second potential connection. In the present example, the contact elements 28a, 29b, 30a, 30b are designed as screw contacts. Accordingly, these have a through opening through which they can be screwed to corresponding contact elements inside the housing 14 in order to connect the respective connection pairs 28, 30 to the high-voltage connections. Alternatively, the contact elements 28a, 28b, 30a, 30b can also be designed as plug-in connections. Furthermore, the plug-in connections 20 are electrically connected to the contact pairs 28, 30, as will be explained in more detail later. The connection device 10 can now be arranged on the housing 14 in such a way that only a part of the contacting unit 24 is inserted through the through opening 18 into the interior of the housing 14, while the connection strip 22 remains outside the housing 14. In particular, the connection strip 22 can rest against a housing component 32 with its rear side 22b. In particular, the connection strip 22 can also be screwed onto the housing component 32 of the housing 14.

This configuration now advantageously makes it possible for the sealing effort to be enormously reduced. In particular, for this purpose only the carrier 26 needs to be sealed relative to the housing 14. This can be achieved in a simple manner, for example, by means of a seal running around on the carrier 26.

In addition, by combining each of the interfaces into a contact strip, namely the connection strip 22, the number of individual parts required to represent the functions can be reduced. Not only is the sealing effort reduced, but also, for example, the number of screw points required for screwing to the housing 14. This also simplifies the interconnection and wiring, as will now be explained in more detail in connection with FIG. 2.

Figure 2:
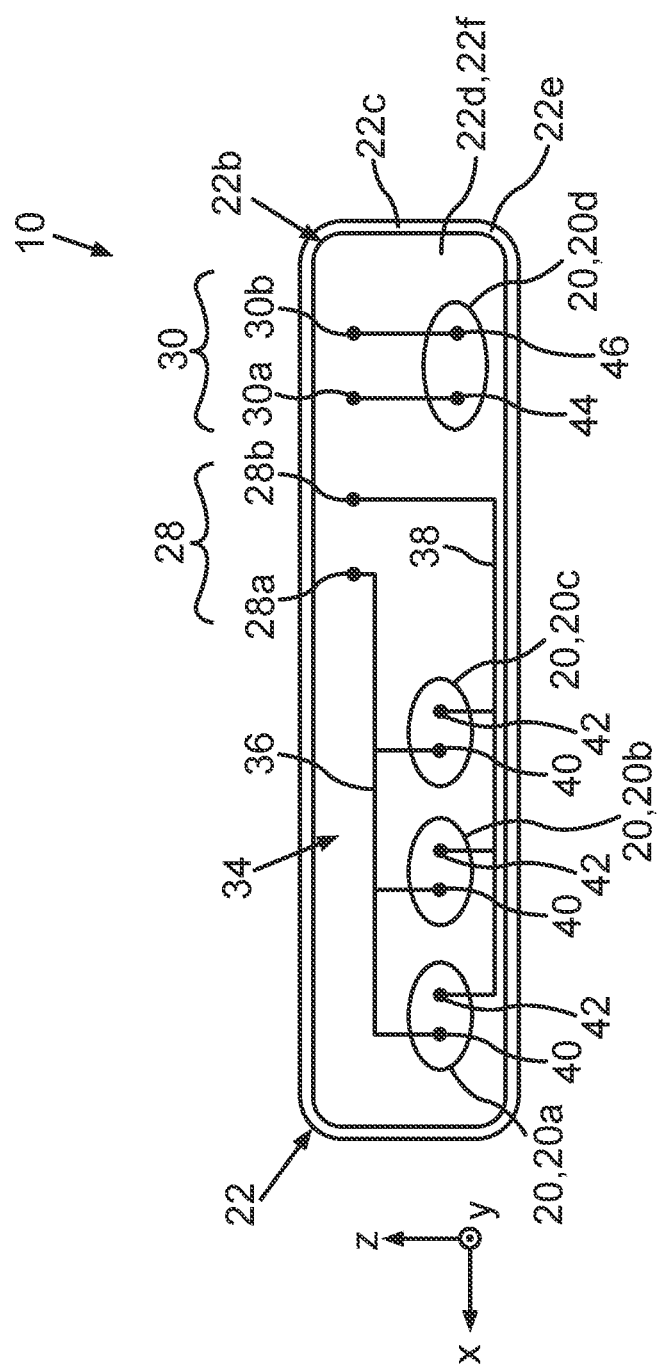
FIG. 2 shows a schematic representation of a rear side of a connection device according to an exemplary embodiment of the invention.

FIG. 2 shows a schematic representation of a top view of the rear side of the connection strip 22 of the connection device 10 according to an exemplary embodiment of the invention. In particular, the structure of the connection device 10 is illustrated using a schematic diagram. The connection device 10 can be designed as described in FIG. 1. The connection device 10 also has an electrical line arrangement 34, by means of which the plug-in connection units 20 are electrically conductively connected to the contact pairs 28, 30. In this example, the line arrangement 34 comprises a first bus line 36 and a second bus line 38. The first bus line 36 is electrically conductively connected to the first contact element 28a of the first connection pair 28 and the second bus line 38 to the second contact element 28b of the first contact pair 28. Furthermore, each plug-in connection unit 20 has a first connection contact 40 and a second connection contact 42. The first connection contacts 40 of the three plug-in connection units 20a, 20b, 20c are electrically conductively connected to the first bus line 36, and the second connection contacts 42 are connected to the second bus line 38. The fourth plug-in connection unit 20d also has a first connection contact 44 and a second connection contact 46. The first connection contact 44 is connected directly to the first contact element 30a of the second contact pair 30 and the second connection contact 46 to the second contact element 30b of the second contact pair 30. These electrical lines can all be considered part of the line arrangement 34. As can be seen in this example, the same potentials can already be partially brought together in the contact strip, that is, in the connection strip 22. This advantageously reduces the number of transfer points to the electrical component, wherein these transfer points are presently provided by the contact elements 28a, 28b, 30a, 30b. In other words, there are fewer connection pairs 28, 30 than plug-in connection units 20. This can also advantageously save additional components. The overall use of materials is reduced. Longitudinal water-tightness can also be easily implemented in a contact strip, such as the present connection strip 22, since, in contrast to the known plug receptacles, only the contact inlets in the electrical housing need to be sealed, that is, in the present case, the contact elements 28a, 28b, 30a, 30b. This is especially true if the shielding is connected to the housing outside of a flange seal. In other words, the shielding of the connection device 10 can be connected to the housing 14 or contacted therewith, wherein the shielding is then arranged outside the seal between the carrier 26 or generally the contacting unit 24 and the housing 14. Longitudinal water, which is guided through a region of the shielding, for example, could therefore not get into the interior of the housing 14.

At high currents, the thermal load on the interfaces, that is to say in this case the plug-in connection units 20, also increases. The use of a contact strip in the form of the connection strip 22 described also offers the possibility of integrating a cooling and of simultaneously cooling several plug-in points 20. Such cooling can, for example, be connected to the strip housing 22c, for example on the second side 22b of the connection strip 22. The cooling device can be connected to a closed cooling circuit of the motor vehicle, in which a coolant, in particular a liquid coolant, is circulated for cooling.

The strip housing 22c can also be constructed as follows: it can comprise a base plate 22d and a circumferential edge 22e that projects in the y direction. This provides an interior 22f in which there is space for the cable routing or arrangement of at least parts of the line arrangement 34 and for the contacting to the individual plug-in connection units 20 and the contacting unit 24. The housing 22c can be open on the rear side. The rear closure of the housing 22c can be provided by a part, in particular the housing part 32, of the housing 14. The housing component 32 can therefore also provide part of the shielding of the connection device 10 at the same time. It is also possible, although not shown here, to integrate conductor holders into the interior 22f for guiding the lines of the line arrangement 34. As a result, the lines of the line arrangement 34 can be safely electrically separated from one another at the same time. It is possible to achieve such a conductor holder using a filling compound introduced into the free space 22f. This also seals the connection strip 22.

Figure 3:
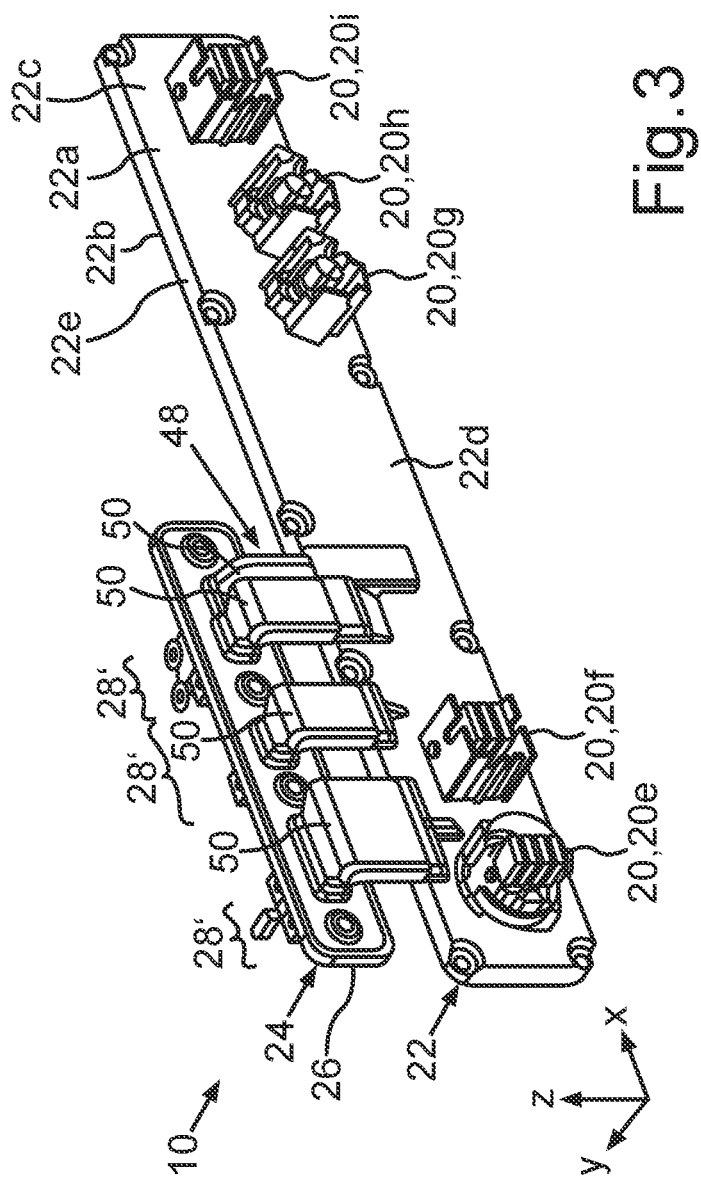
FIG. 3 shows a schematic and perspective representation of a connection device according to a further exemplary embodiment of the invention.

FIG. 3 shows a schematic illustration of a connection device 10 according to a further exemplary embodiment of the invention. The connection device 10 can be designed as described above, except for the differences described below. In the present example, the contacting unit 24 and the connection strip 22 are designed to be spatially separated from one another. Furthermore, the contacting unit 24 and the connection strip 22 are electrically connected to one another via a connecting portion 28 of the line arrangement 34. In this example, the connecting portion 28 comprises several connection elements 50. Each of these connection elements 50 may have an electric line as part of the line arrangement 34, which electrically connects the connectors 40, 42, 44, 46 with the corresponding connection pairs 28". In addition, the connection elements 50 can each be encased by electrical insulation and electromagnetic shielding. In the present example, the connection strip 22 comprises five plug-in connection units 20, namely a plug-in connection unit 20e for connecting to a DC (direct current) charging connection, a plug-in connection 20f for coupling to the rear axle drive, a plug-in connection 20g for front auxiliary consumers, a plug-in connection 20h for rear auxiliary consumers and one plug-in connection 20i for a front axle drive. The front and rear auxiliary consumers can be, for example, an air conditioning compressor and/or roll stabilizer. Depending on their positioning in the motor vehicle, these can be connected to one of these two connection units 20g, 20h. The terms "front" and "rear" in this case refer to the positioning of the auxiliary consumers in the motor vehicle in relation to the longitudinal axis of the motor vehicle.

It is particularly advantageous if the connecting portion 48 is designed to be flexible. This can be achieved using flexible busbars as part of the connection elements 50. As already described, these are insulated and shielded. This also makes it possible to achieve tolerance compensation between the connection strip 22 and the contacting unit 24. Thus, the connection strip 22 can, for example, also be arranged at a different location and on a different housing or component than the contacting unit 24. This, in turn, as described for the contacting unit 24 in FIG. 1, can be arranged on a through opening 18 of housing 14, for example the high-voltage battery 16, and/or also on a housing of an electronics box, which is arranged on the housing of a high-voltage battery, for example. The sealing measures can thus in turn be limited to the contacting unit 24. Furthermore, the connection strip 22 can however also be designed as described above, in particular with the conductor holding options described above, and it can be arranged with its rear side 22b on a component, for example also on the housing component 32 of the housing 14. In this example too the contacting unit 24 only requires a single seal to seal it from the housing 14. This can be provided by a sealing track or seal running around the edge region of the carrier 26. Longitudinal water-tightness may also be provided for the individual contact elements of the contact pairs 28'. But here, too, the sealing is considerably easier because of the reduced number of contact pairs 28' compared to the number of plug-in units 20. In addition, here too the shielding or its contacting to the housing 14 can be implemented outside the sealing of the carrier 26 of the contacting unit 24.

Overall, the examples show how the invention can provide a contact strip for high-voltage systems. The invention advantageously enables the plug receptacles to be combined at one point in a contact strip. Their position can be optimized with regard to crash, assembly and disassembly requirements. The transfer or connection point to the electrical components can also be selected independently of the plug positions. The power is then transmitted within the header strip, namely the connection strip, through busbars or lines that are connected to the plug receptacles. This enables numerous advantageous design variants, for example screwing with tolerance compensation elements if the plug receptacles and the contacting unit are positioned on different components, wherein these units can be connected by means of flexible busbars that are insulated and shielded if the plug receptacles and the contacting unit are positioned on different components. In addition, the housing of the connection unit can be designed as a plastic housing with integrated device receptacles, namely plug receptacles, or as an aluminum housing with mounted plug receptacles. In addition, plastic inserts can be provided as conductor track holders or conductor holders for positioning and mutually insulating the conductor tracks. In addition, positioning and mutual insulation of the conductor tracks can also be achieved by filling in a potting compound. In addition, inserted shield plates can ensure that EMC requirements are also met. In addition, the screw-on surfaces can also be included in the EMC shielding. The contacting in the electrical housing can also be made with a screwed contact or a plug-in contact.

The invention claimed is:

1. A connection device for electrically connecting multiple first electrical components to a second electrical component of a motor vehicle and for arrangement on a first housing of the second component, wherein at least one first and one second potential connection are arranged inside the first housing,
    the connection device comprising:
    a connection strip which has a first side and a second opposite side relative to a first direction for arrangement on a first component, wherein the first side has multiple electrical plug-in connection units for the respective electrical connection of one of the multiple first electrical components by means of a respective plug-in connection;
    a contacting unit, which has a carrier for arrangement at a through opening of the first housing and at least one contact pair arranged on the carrier with a first contact element for electrically contacting the first potential connection and a second contact element for electrically contacting the second potential connection; and
    an electrical line arrangement, by which the multiple plug-in connection units are electrically conductively connected to the at least one contact pair.

2. The connection device according to claim 1, wherein the line arrangement has a first bus line which is electrically conductively connected to the first contact element and has a second bus line which is electrically conductively connected to the second contact element, wherein the multiple plug-in connection units comprise a first plug-in connection unit and a second plug-in connection unit, which respectively have a first connection contact which is electrically conductively connected to the first bus line, and a second connection contact which is electrically conductively connected to the second bus line.

3. The connection device according to claim 1, wherein the contacting unit has multiple contact pairs arranged on the same side of the carrier.

4. The connection device according to claim 1, wherein the carrier of the contacting unit is arranged on the second side of the connection strip.

5. The connection device according to claim 1, wherein the contacting unit is designed to be spatially separated from the connection strip, and the line arrangement has a connecting portion via which the contacting unit and the connection strip are connected.

6. The connection device according to claim 1, wherein the connecting portion of the line arrangement is designed to be flexible.

7. A connection arrangement with a connection device according to claim 1, wherein the connection arrangement has the first housing of the second component, in particular of the energy storage or of an electronic unit associated with the energy storage, wherein the carrier is arranged at the through opening of the first housing, so that the at least one contact pair projects into an interior of the first housing and at least the plug-in connection units are arranged outside the first housing.

8. The connection arrangement according to claim 7, wherein the carrier is arranged in a sealed manner at the through opening.

9. The connection arrangement according to claim 7, wherein the connection strip is arranged on the first component, which is part of a third component that is different from the second component, in particular is part of a second housing that is different from the first housing, on which the contacting unit is arranged.

10. The connection arrangement according to claim 7, wherein the connection strip is arranged on the first component, which represents part of an electromagnetic shielding of the connection strip.

11. The connection device according to claim 2, wherein the contacting unit has multiple contact pairs arranged on the same side of the carrier.

12. The connection device according to claim 2, wherein the carrier of the contacting unit is arranged on the second side of the connection strip.

13. The connection device according to claim 3, wherein the carrier of the contacting unit is arranged on the second side of the connection strip.

14. The connection device according to claim 2, wherein the contacting unit is designed to be spatially separated from the connection strip, and the line arrangement has a connecting portion via which the contacting unit and the connection strip are connected.

15. The connection device according to claim 3, wherein the contacting unit is designed to be spatially separated from the connection strip, and the line arrangement has a connecting portion via which the contacting unit and the connection strip are connected.

16. The connection device according to claim 4, wherein the contacting unit is designed to be spatially separated from the connection strip, and the line arrangement has a connecting portion via which the contacting unit and the connection strip are connected.

17. The connection device according to claim 2, wherein the connecting portion of the line arrangement is designed to be flexible.

18. The connection device according to claim 3, wherein the connecting portion of the line arrangement is designed to be flexible.

19. The connection device according to claim 4, wherein the connecting portion of the line arrangement is designed to be flexible.

20. The connection device according to claim 5, wherein the connecting portion of the line arrangement is designed to be flexible.

* * * * *